UNITED STATES PATENT OFFICE.

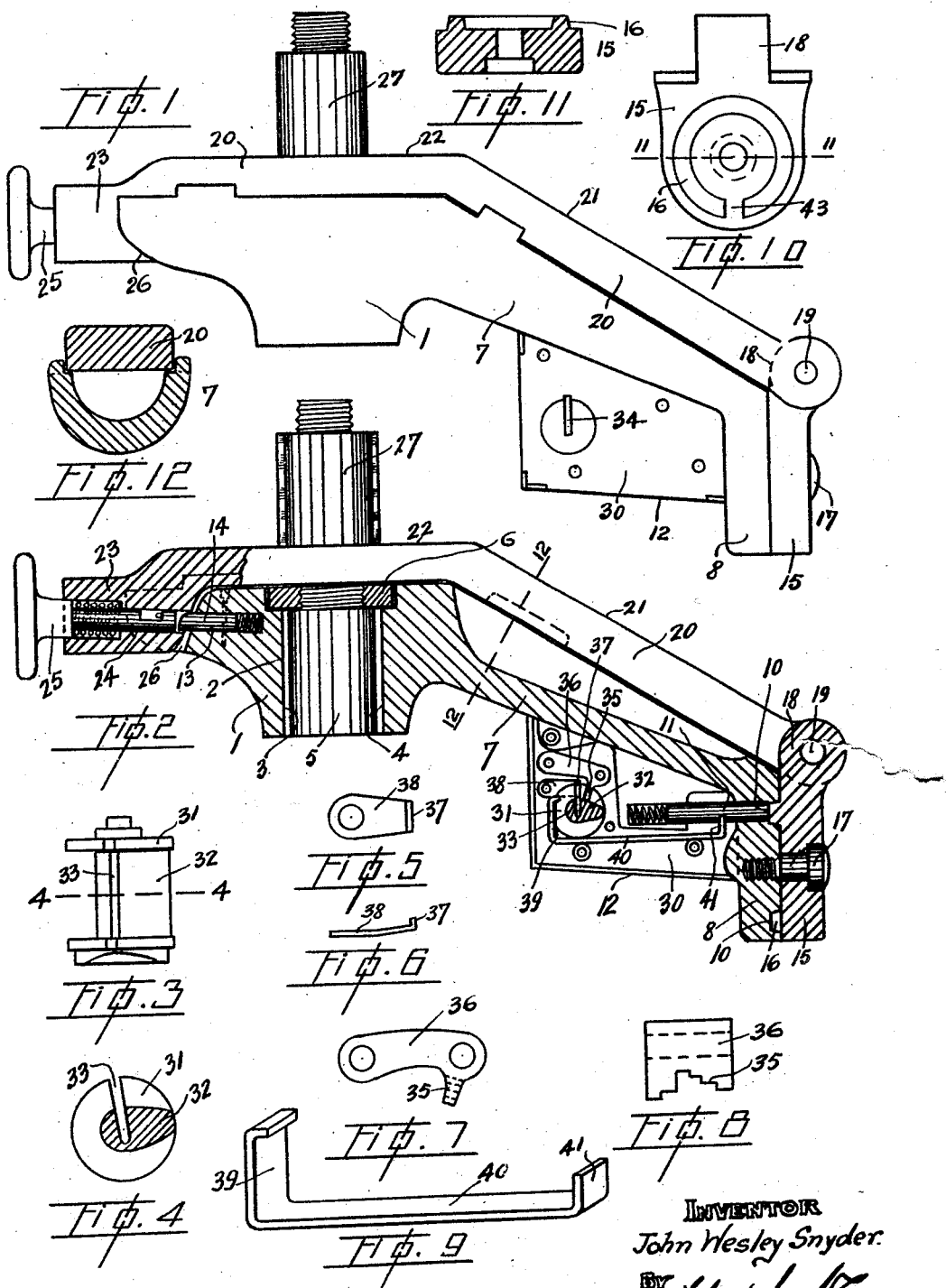

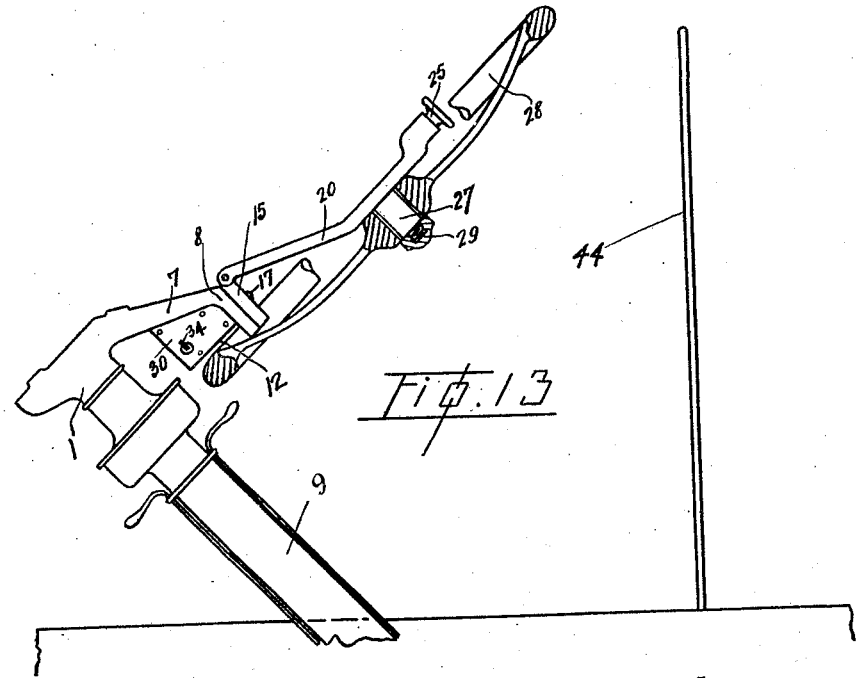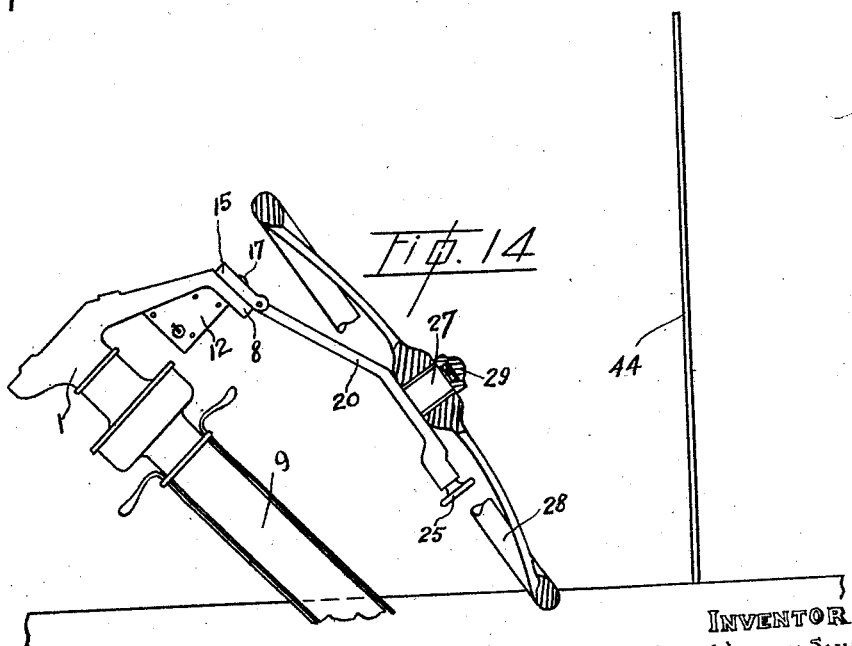

JOHN WESLEY SNYDER, OF VANCOUVER, BRITISH COLUMBIA, CANADA.

AUTOMOBILE LOCKING DEVICE.

1,408,911. Specification of Letters Patent. Patented Mar. 7, 1922.

Application filed December 10, 1920. Serial No. 429,707.

*To all whom it may concern:*

Be it known that I, JOHN WESLEY SNYDER, a subject of the King of Great Britain, and a resident of the city of Vancouver, in the Province of British Columbia, Canada, have invented certain new and useful Improvements in Automobile Locking Devices, of which the following is a specification.

My invention relates to improvements in devices for preventing the theft of automobiles and other like vehicles, and the object of my invention is to provide a device by the use of which the steering wheel of the automobile may be so arranged that while it is normally available for driving purposes it may be readily detached when desired from the steering rod when the car is stopped and locked securely in the detached position so that it is impossible for the steering rod to be operated to steer the car, thus rendering it practically impossible for an unauthorized party to steal the car, while an inherent advantage of the arrangement is that the wheel may be swung forwardly so as to be out of the way of the occupants of the front seat when entering or leaving the car.

I attain this object by the construction illustrated in the accompanying drawings in which—

Fig. 1 is a side elevation of the device.

Fig. 2 is a sectional view taken on the longitudinal centre line of Fig. 1.

Fig. 3 is a plan view of the unlocking cam.

Fig. 4 is a sectional view taken on the line 4—4 of Fig. 3.

Figs. 5, 6, 7, 8 and 9 represent details of the lock mechanism.

Fig. 10 is an inside face view of the swinging arm hinge plate.

Fig. 11 is a sectional view taken on the line 11—11 of Fig. 10.

Fig. 12 is a sectional view taken on the line 12—12 of Fig. 2.

Fig. 13 is a view illustrating the wheel position when swung out of the way but not locked.

Fig. 14 is a view illustrating the wheel position when locked.

Similar figures of reference indicate similar parts throughout the several views.

1 indicates a boss having a bore 2 provided with keyways 3 and 4, the bore and keyways being adapted to fit the upper end 5 of an automobile steering rod after the steering wheel is removed therefrom, the boss being secured in place by means of a nut 6 which takes the place of the steering wheel nut. Extending forwardly from the boss 1 is an inclined stationary arm 7 having its outer end 8 turned downwardly to lie substantially parallel with the steering column 9, as shown more particularly in Figs. 1, 2, 13 and 14, the face of the end 8 being provided with an annular groove 10, into which projects the end of a locking bolt 11 forming part of the mechanism of a lock, indicated generally by the numeral 12, secured to the underside of the arm 7 adjacent the end 8, the locking bolt 11 extending slidably through the end 8, as shown in Fig. 2. In the side of the boss 1 diametrically opposite to the arm 7 is formed a bore 13 in which is mounted a spring-pressed plunger 14 for a purpose hereinafter described.

Rotatably mounted on the end 8 of the arm 7 is a plate 15 having an annular rib 16 notched in its lower side as at 43 fitting slidably the groove 10, this plate being connected concentrically to the end 8 by means of a set screw 17 which acts as a pivot about which the plate turns, and the upper end of the plate extends above the upper part of the end 8 and is provided with an eye 18 to which is hingedly connected by means of a pin 19 a swinging arm 20 the shape of which is substantially the same as that of the upper surface of the arm 7 and boss 1, that is to say, the arm 20 is inclined for a portion of its length, as at 21, to lie snugly on the inclined arm 7 while for the remainder of its length it is horizontal, as at 22, so as to lie flat on the top of the boss 1 being, however, extended beyond the boss, as at 23, and provided in the extension with a bore 24 in which is seated a spring-pressed push button 25 the inner end of which bears normally on the point of the spring-pressed plunger 14 hereinbefore mentioned, the point of the plunger being normally engaged in the bore 24 to lock the arm 20 in normal position, as shown in Fig. 2. The boss 1 is slotted as at 26 so that the extension 23 of the arm 20 may normally rest in the slot, as shown in Fig. 2, and steady the arm when in the position shown in Figs. 1 and 2.

Secured into the horizontal portion 22 of the arm 20 concentrically of the steering rod 5 is a vertical stud 27 adapted to receive the steering wheel 28 and on this stud the steering wheel is mounted, being held in place by means of a nut 29, as shown in Figs. 13 and 14. The lock 12 is secured adjacent the end 8, on the underside of the arm 7 and consists of a closed casing 30 in which is rotatably mounted a barrel 31 the mid portion of which is formed as a cam 32, which barrel is slotted, as at 33, this slot being normally in alignment with a slot 34 in the casing so that a key may be inserted therein in the usual manner to retract the locking bolt, and which key is provided with wards corresponding to wards 35 in a check block 36, this ward arrangement being, however well known in lock construction. The barrel 31 is maintained in normal position by the engagement in the slot 33 of the inwardly turned end 37 of a suitably secured spring member 38, while adjacent the cam 32 is disposed the upturned end 39 of a draw bar 40 which extends under and parallel to the locking bolt 11, the opposite end of the draw bar being also turned upwardly, as at 41, and engaged in a notch 42 formed in the bolt, as shown in Fig. 2.

The manner in which the device is used and operated may be briefly described. The steering wheel is first of all removed from its usual place on the end 5 of the steering rod and the boss 1 is then fitted on to the end of the rod, being secured permanently in place by the nut 6. The steering wheel is positioned on the vertical stud 27 and secured by the nut 29, from which it will be seen that the steering rod may be then be operated in the usual manner, the entire device turning with the wheel. Should it be desired to swing the wheel out of the way of the occupants of the front seat, as when entering or leaving the car, the push button 25 is pressed inwardly to disengage the point of the plunger 14 from the bore 24, when the arm 20 and the steering wheel may be swung upwardly and forwardly towards the windshield 44, as shown in Fig. 13, while to lock the arm 20 so that it cannot be returned to place by any unauthorized party after having been once swung out of place the arm 20 is swung downwardly in a circumferential direction around the pivot 17 so that when the limit of downward movement is reached the notch 43 in the rib 16 registers with the point of the locking bolt 11 so that the latter is forced thereinto by the spring behind it, thus preventing movement of the arm 20 in any direction until the bolt 11 is retracted out of the notch by the retraction of the draw bar 40, which retraction is effected by inserting the proper key into the slot 33 of the barrel 31 so that the point of the key forces the end 37 of the spring 38 out of the slot 33, thus allowing the barrel 31 to be turned by the key to carry the cam 32 round to bear on the upturned end 39 of the draw bar and thus retract it and the locking bolt, allowing the arm 20 to be then swung upwardly so that the arm and the steering wheel may be returned to their normal positions.

What I claim as my invention is:—

1. An automobile locking device comprising a laterally extending arm secured to the automobile steering rod and rotatable therewith, said arm having its outer end turned downwardly and provided in the turned down portion with an annular groove, a plate pivotally connected to the said turned down portion and rotatable in a circumferential direction thereon having an annular rib fitting slidably said annular groove, the upper end of said plate being eyed, an arm hingedly connected to said eye normally superposed on said lateral arm provided with means whereby a steering wheel may be secured to it concentrically of the steering rod, and means for locking said plate against return movement when swung circumferentially from its normal position.

2. An automobile locking device comprising a laterally extending arm secured to the automobile steering rod and rotatable therewith, said arm having its outer end turned downwardly and provided in the turned down portion with an annular groove, a key-operated lock secured to the underside of said arm adjacent the said turned down portion and including a locking bolt the point of which extends adjacent the bottom of said groove on its high side, a plate eyed at its upper end pivotally connected to the said turned down portion and rotatable thereon in a circumferential direction having an annular rib fitting slidably the said annular groove, the said rib having a notch in its low side into which the said locking bolt extends when the said plate is swung circumferentially to carry the notch into registration with the bolt, and an arm hingedly connected to said eye normally superposed on said lateral arm provided with means whereby a steering wheel may be secured to it concentrically of said steering rod.

3. The combination with a steering post mounting a spring pressed plunger, of a steering wheel carrying arm hinged at one end to the post and having the opposite end thereof formed with a bore adapted to receive said plunger therein and a releasing member mounted in said bore and engageable with said plunger to release the wheel carrying arm for swinging movement to an out-of-the-way position.

4. The combination with a steering post of a plate rotatably supported thereby, an arm hinged at one end to said plate, a steering wheel carried by the arm and adapted in one position of the latter to be disposed in operative position over the end of the steering post, means for locking the arm in operative position and means engageable with said rotatable plate for locking said arm in an inoperative position.

5. The combination with a steering post mounting a spring pressed plunger and a rotatable plate, of a steering heel carrying arm hinged at one end to said plate and having the opposite end thereof formed with a bore adapted to receive said plunger to lock the arm in one position, a releasing member mounted in the bore and movable into engagement with said plunger to force the latter outwardly of the bore and means engageable with said rotatable plate for locking said arm in a second position.

Dated at Vancouver, B. C., this 27th day of November, 1920.

JOHN WESLEY SNYDER.